United States Patent
Negishi

(10) Patent No.: US 8,835,337 B2
(45) Date of Patent: Sep. 16, 2014

(54) OPTICAL GLASS, PRESS-MOLDING GLASS MATERIAL, AND OPTICAL ELEMENT AND METHOD OF MANUFACTURING THE SAME

(71) Applicant: Hoya Corporation, Tokyo (JP)

(72) Inventor: Tomoaki Negishi, Shinjuku-ku (JP)

(73) Assignee: Hoya Corporation, Tokyo (JP)

(*) Notice: Subject to any disclaimer, the term of this patent is extended or adjusted under 35 U.S.C. 154(b) by 84 days.

(21) Appl. No.: 13/667,431

(22) Filed: Nov. 2, 2012

(65) Prior Publication Data

US 2013/0172169 A1    Jul. 4, 2013

(30) Foreign Application Priority Data

Nov. 8, 2011 (JP) .................... 2011-244183

(51) Int. Cl.
*C03C 3/068* (2006.01)
*C03C 3/066* (2006.01)
*C03C 3/064* (2006.01)
*C03C 3/155* (2006.01)
*G02B 1/00* (2006.01)

(52) U.S. Cl.
CPC ........... *C03C 3/068* (2013.01); *C03C 3/066* (2013.01); *C03C 3/064* (2013.01); *G02B 1/00* (2013.01); *C03C 3/155* (2013.01)
USPC .................. 501/78; 501/58; 501/79

(58) Field of Classification Search
CPC .......... C03C 3/155; C03C 3/068; C03C 3/066
USPC .................. 501/51, 78, 79; 65/102
See application file for complete search history.

(56) References Cited

U.S. PATENT DOCUMENTS

2008/0287280 A1    11/2008    Onoda et al.
2011/0077142 A1    3/2011    Yamaguchi et al.

FOREIGN PATENT DOCUMENTS

| JP | 2007-269584 A | 10/2007 |
| JP | 2008-214135 A | 9/2008 |
| JP | 2009-167078 A | 7/2009 |
| JP | 2011-093780 A | 5/2011 |
| JP | 2011093780 A * | 5/2011 |
| JP | 2011144069 A * | 7/2011 |

OTHER PUBLICATIONS

Japanese International Search Report and Written Opinion for PCT Application No. PCT/JP2012/078299, which claims priority from correspnding Japanese Patent Application No. 2011-244183, dated Jan. 11, 2012.
International Preliminary Report on Patentability dated May 13, 2014 from the International Searching Authority in counterpart application No. PCT/JP2012/078299.

* cited by examiner

*Primary Examiner* — Karl Group
*Assistant Examiner* — Elizabeth A Bolden
(74) *Attorney, Agent, or Firm* — Sughrue Mion, PLLC

(57) ABSTRACT

An optical glass, comprising, denoted as cation percentages: a content of $Si^{4+}$ and $B^{3+}$ (35 to 55); a combined content of $La^{3+}$, $Gd^{3+}$, and $Y^{3+}$ (30 to 55), wherein $Gd^{3+}$ is 5 to 20%; a content of $Ti^{4+}$, $Nb^{5+}$, $Ta^{5+}$ and $W^{6+}$ (7 to 20); $Zr^{4+}$ (2 to 8); and $Zn^{2+}$ (0 to 10); wherein a cation ratio of $Zn^{2+}$ to $Gd^{3+}$ is 0 to 0.80; a cation ratio of $Gd^{3+}$ to $Ti^{4+}$, $Nb^{5+}$, $Ta^{5+}$, and $W^{6+}$ combined is 0.65 to 2.00; a cation ratio of $Ta^{5+}$ to $Ti^{4+}$, $Nb^{5+}$, $Ta^{5+}$, and $W^{6+}$ combined is 0 to 0.30; a cation ratio of $Ti^{4+}$ to $Ti^{4+}$, $Nb^{5+}$, $Ta^{5+}$, and $W^{6+}$ combined is 0.30 to 0.90; and a refractive index nd is 1.890 to 1.950, and an Abbé number vd of equal to or lower than 39.0, the Abbé number vd satisfying a relation of $vd \geq (2.334-nd)/0.012$ relative to nd.

11 Claims, 1 Drawing Sheet
(1 of 1 Drawing Sheet(s) Filed in Color)

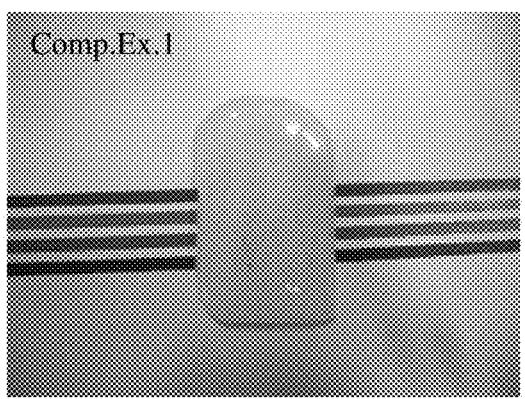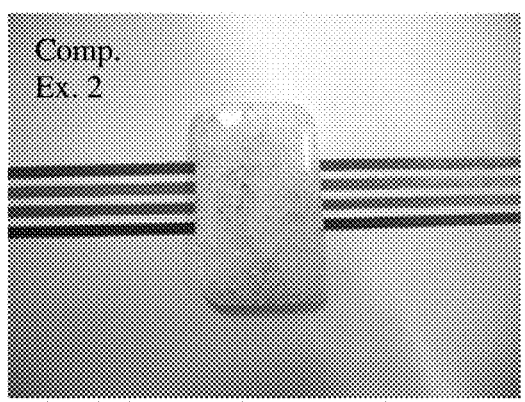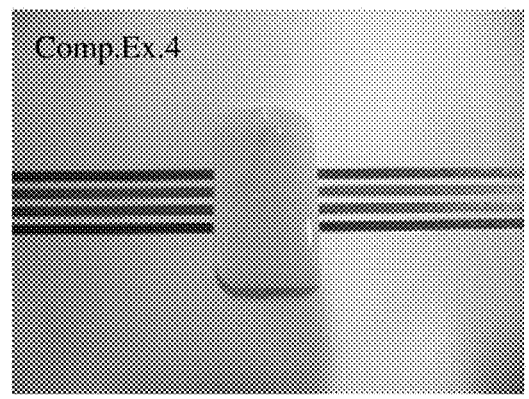

OPTICAL GLASS, PRESS-MOLDING GLASS MATERIAL, AND OPTICAL ELEMENT AND METHOD OF MANUFACTURING THE SAME

CROSS-REFERENCE TO RELATED APPLICATIONS

This application claims the benefit of priority under 35 USC 119 to Japanese Patent Application No. 2011-244183, filed on Nov. 8, 2011, which is expressly incorporated herein by reference in its entirety.

BACKGROUND OF THE INVENTION

1. Field of the Invention

The present invention relates to an optical glass; a press-molding glass material and an optical element comprised of the optical glass; and a method of manufacturing an optical element employing the press-molding glass material.

2. Discussion of the Background

In recent years, with the development of highly functional and compact image pickup devices, demand for lenses made of high-refractive-index glass has been rising. High-refractive-index, low-dispersion glasses such as that described in Japanese Unexamined Patent Publication (KOKAI) No. 2007-269584 are known as glass materials for such lenses. Combining a lens comprised of a high-refractive-index, low-dispersion glass with a lens comprised of a high-refractive-index, high-dispersion glass makes it possible to obtain a compact optical system while correcting chromatic aberration. Such lenses occupy extremely important positions as optical elements constituting projection optical systems such as projectors and image pickup optical systems.

$Ta_2O_5$ has been employed as a main component in conventional high-refractive-index, low-dispersion glasses (for example, see Japanese Unexamined Patent Publication (KOKAI) No. 2007-269584). That is because $Ta_2O_5$ contributes to enhancing devitrification, manufacturing stability, and the like in high-refractive-index, low-dispersion glasses. However, in recent years, the cost of rare metals has been soaring. Among these, the cost of tantalum (Ta) has risen markedly. In addition, its supply on the market is reduced. Thus, in the field of glass manufacturing, there has been a need to reduce the quantity of tantalum employed as a glass starting material.

SUMMARY OF THE INVENTION

An aspect of the present invention provides for a high-quality, high-refractive-index, low-dispersion glass affording good suitability to manufacturing while keeping down the quantity of $Ta_2O_5$ utilized.

An aspect of the present invention relates to an optical glass, which is an oxide glass comprising, denoted as cation percentages:
a combined content of $Si^{4+}$ and $B^{3+}$ of 35 to 55 percent;
a combined content of $La^{3+}$, $Gd^{3+}$, and $Y^{3+}$ of 30 to 55, wherein a content of $Gd^{3+}$ ranging from 5 to 20 percent;
a combined content of $Ti^{4+}$, $Nb^{5+}$, $Ta^{5+}$ and $W^{6+}$ of 7 to 20 percent;
2 to 8 percent of $Zr^{4+}$; and
0 to 10 percent of $Zn^{2+}$;
wherein a cation ratio of a content of $Zn^{2+}$ to a content of $Gd^{3+}$ ($Zn^{2+}/Gd^{3+}$) ranges from 0 to 0.80;
a cation ratio of the content of $Gd^{3+}$ to the combined content of $Ti^{4+}$, $Nb^{5+}$, $Ta^{5+}$, and $W^{6+}$ ($Gd^{3+}/(Ti^{4+}+Nb^{5+}+Ta^{5+}+W^{6+})$) ranges from 0.65 to 2.00;
a cation ratio of a content of $Ta^{5+}$ to the combined content of $Ti^{4+}$, $Nb^{5+}$, $Ta^{5+}$, and $W^{6+}$ ($Ta^{5+}/(Ti^{4+}+Nb^{5+}+Ta^{5+}+W^{6+})$) ranges from 0 to 0.30;
a cation ratio of a content of $Ti^{4+}$ to the combined content of $Ti^{4+}$, $Nb^{5+}$, $Ta^{5+}$, and $W^{6+}$ ($Ti^{4+}/(Ti^{4+}+Nb^{5+}Ta^{5+}+W^{6+})$) ranges from 0.30 to 0.90; and
which has a refractive index ranging from 1.890 to 1.950, and an Abbé number νd of equal to or lower than 39.0, the Abbé number νd satisfying a relation of νd≥(2.334−nd)/0.012 relative to the refractive index nd.

Further aspects of the present invention provide:
a press-molding glass material comprised of the above optical glass;
an optical element comprised of the above optical glass; and
a method of manufacturing an optical element, which comprises steps of:
preparing a molded glass article by heating and press molding with a pressing mold the above press-molding glass material; and
processing the molded glass article that has been prepared to provide an optical element.

An aspect of the present invention makes it possible to stably supply a high-refractive-index, low-dispersion glass without employing a large quantity of tantalum.

Other exemplary embodiments and advantages of the present invention may be ascertained by reviewing the present disclosure and the accompanying drawing.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention will be described in the following text by the exemplary, non-limiting embodiments shown in the FIGURE, wherein:

FIG. 1 is shows results (a digital camera photograph) indicating that vitrification did not take place in Comparative Examples 1, 2, and 4.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

[Optical Glass]

The optical glass according to an aspect of the present invention is an optical glass, which is an oxide glass comprising, denoted as cation percentages:

a combined content of $Si^{4+}$ and $B^{3+}$ of 35 to 55 percent;
a combined content of $La^{3+}$, $Gd^{3+}$, and $Y^{3+}$ of 30 to 55, wherein a content of $Gd^{3+}$ ranging from 5 to 20 percent;
a combined content of $Ti^{4+}$, $Nb^{5+}$, $Ta^{5+}$ and $W^{6+}$ of 7 to 20 percent;
2 to 8 percent of $Zr^{4+}$; and
0 to 10 percent of $Zn^{2+}$;
wherein a cation ratio of a content of $Zn^{2+}$ to a content of $Gd^{3+}(Zn^{2+}/Gd^{3+})$ ranges from 0 to 0.80;
a cation ratio of the content of $Gd^{3+}$ to the combined content of $Ti^{4+}$, $Nb^{5+}$, $Ta^{5+}$, and $W^{6+}(Gd^{3+}/(Ti^{4+}+Nb^{5+}+Ta^{5+}+W^{6+}))$ ranges from 0.65 to 2.00;
a cation ratio of a content of $Ta^{5+}$ to the combined content of $Ti^{4+}$, $Nb^{5+}$, $Ta^{5+}$, and $W^{6+}(Ta^{5+}/(Ti^{4+}+Nb^{5+}+Ta^{5+}+W^{6+}))$ ranges from 0 to 0.30;
a cation ratio of a content of $Ti^{4+}$ to the combined content of $Ti^{4+}$, $Nb^{5+}$, $Ta^{5+}$, and $W^{6+}$ $(Ti^{4+}/(Ti^{4+}+Nb^{5+}+Ta^{5+}+W^{6+}))$ ranges from 0.30 to 0.90; and
which has a refractive index ranging from 1.890 to 1.950, and an Abbé number νd of equal to or lower than 39.0, the Abbé number νd satisfying a relation of νd≥(2.334−nd)/0.012 relative to the refractive index nd.

The optical glass according to an aspect of the present invention will be described in greater detail below. Below, unless specifically stated otherwise, "percent" shall be used to mean "cation percent".

Glass Composition

The optical glass of the present invention is an oxide glass with $O^{2-}$ as the main anion component. Examples of anion components in addition to $O^{2-}$ are $F^-$ and $Cl^-$. The $O^{2-}$ content is desirably equal to or greater than 95 anion percent, preferably equal to or greater than 98 anion percent, more preferably equal to or greater than 99 anion percent, and still more preferably, 100 anion percent.

The cation components will be described next.

Both $Si^{4+}$ and $B^{3+}$ are glass network-forming components. When the combined content of $Si^{4+}$ and $B^{3+}$ is less than 35 percent, the refractive index rises but the Abbé number drops, the stability of the glass diminishes, and the liquidus temperature rises. Conversely, when the combined content of $Si^{4+}$ and $B^{3+}$ exceeds 55 percent, the refractive index drops and the Abbé number rises. Thus, the combined content of $Si^{4+}$ and $B^{3+}$ is set to 35 to 55 percent. From the above perspective, the upper limit of the combined content of $Si^{4+}$ and $B^{3+}$ is desirably 50 percent, preferably 49 percent, and more preferably, 48 percent, and the lower limit is desirable 40 percent, preferably 42 percent, and more preferably, 43 percent.

$Si^{4+}$ is desirably incorporated as an essential component in a quantity of equal to or greater than 6 percent because it serves to increase the viscosity of the glass and enhance the stability and moldability of the glass. From the perspectives of the refractive index and meltability, the $Si^{4+}$ content is desirably equal to or lower than 15 percent. From the above perspectives, the upper limit of the $Si^{4+}$ content is preferably 14 percent, more preferably 13 percent, still more preferably 12 percent, and yet still more preferably, 11 percent.

From the perspectives of glass stability and moldability, the lower limit of the $Si^{4+}$ content is preferably 7 percent, more preferably 8 percent, still more preferably 9 percent, and yet more preferably, 10 percent.

$B^{3+}$ is a component that serves to enhance the stability of the glass, lower the liquidus temperature, and enhance the moldability of the glass. From the perspectives of maintaining the stability of the glass while raising the refractive index and ensuring manufacturing stability by preventing a rise in the liquidus temperature, the $B^{3+}$ content is desirably equal to or greater than 25 percent. From the above perspectives, the lower limit of the $B^{3+}$ content is desirably 28 percent, preferably 30 percent, more preferably 32 percent, and still more preferably, 33 percent.

From the perspective of lowering the refractive index, the $B^{3+}$ content is desirably equal to or lower than 45 percent. From the above perspective, the upper limit of the $B^{3+}$ content is preferably 42 percent, more preferably 40 percent, still more preferably 38 percent, and yet more preferably, 37 percent.

The combined content of $Si^{4+}$ and $B^{3+}$ is as set forth above. Since the refractive index drops and the liquidus temperature rises when the cation ratio of the $B^{3+}$ content to the above combined content $(B^{3+}/(Si^{4+}+B^{3+}))$ is less than 0.3, the cation ratio $(B^{3+}/(Si^{4+}+B^{3+}))$ is desirably 0.3 to 1.

To enhance the stability of the glass, the upper limit of the cation ratio $(B^{3+}/(Si^{4+}+B^{3+}))$ is preferably 0.99, more preferably 0.95, still more preferably 0.90, yet more preferably 0.85, and yet still more preferably, 0.80. The lower limit of the cation ratio $(B^{3+}/(Si^{4+}+B^{3+}))$ is desirably 0.40, preferably 0.50, more preferably 0.60, still more preferably 0.70, and yet still more preferably, 0.75.

$La^{3+}$ is a component that enhances the stability of the glass and raises the refractive index without increasing the ΔPg, F value, an indicator of the partial dispersion characteristic, described further below.

$Gd^{3+}$ is a component that raises the refractive index without increasing the ΔPg, F value.

$Y^{3+}$ is a component that raises the refractive index without increasing the ΔPg, F value.

When the combined content of $La^{3+}$, $Gd^{3+}$, and $Y^{3+}$ is less than 30 percent, it becomes difficult to maintain the stability of the glass and inhibit a rise in the liquidus temperature while achieving a high refractive index and low dispersion. By contrast, when the combined content of $La^{3+}$, $Gd^{3+}$, and $Y^{3+}$ exceeds 55 percent, it becomes difficult to maintain the stability of the glass and inhibit an increase in the specific gravity while achieving a high refractive index and low dispersion. Accordingly, the combined content of $La^{3+}$, $Gd^{3+}$, and $Y^{3+}$ falls within a range of 30 to 55 percent. From the above perspective, the upper limit of the combined content of $La^{3+}$, $Gd^{3+}$, and $Y^{3+}$ is desirably 55 percent, preferably 45 percent, and more preferably, 40 percent. The lower limit of the combined content of $La^{3+}$, $Gd^{3+}$, and $Y^{3+}$ is desirably 32 percent, preferably 34 percent, and more preferably, 35 percent.

From the perspectives of enhancing the stability of the glass and raising the refractive index without increasing the ΔPg, F value, the $La^{3+}$ content is desirably equal to or greater than 15 percent. From the above perspectives, the lower limit of the $La^{3+}$ content is preferably 17 percent, more preferably 19 percent, still more preferably 20 percent, and yet more preferably, 21 percent.

From the perspectives of maintaining the stability of the glass and inhibiting a rise in the liquidus temperature and an increase in the specific gravity, the $La^{3+}$ content is desirably equal to or lower than 30 percent. From the above perspectives, the upper limit of the $La^{3+}$ content is preferably 28 percent, more preferably 26 percent, still more preferably 25 percent, and yet more preferably, 24 percent.

From the perspective of raising the refractive index without increasing the $\Delta Pg$, F value, the $Gd^{3+}$ content is desirably equal to or greater than 5 percent. From the above perspective, the lower limit of the $Gd^{3+}$ content is desirably 6 percent, preferably 7 percent, more preferably 8 percent, still more preferably 9 percent, and yet more preferably, 10 percent.

From the perspectives of maintaining the stability of the glass and inhibiting a rise in the liquidus temperature and an increase in the specific gravity, the $Gd^{3+}$ content is desirably equal to or lower than 20 percent. From the above perspectives, the upper limit of the $Gd^{3+}$ content is preferably 18 percent, more preferably 16 percent, still more preferably 14 percent, and yet more preferably, 12 percent.

From the perspectives of maintaining the stability of the glass and inhibiting a rise in the liquidus temperature and an increase in the specific gravity, the $Y^{3+}$ content is desirably equal to or lower than 10 percent. From the above perspectives, the upper limit of the $Y^{3+}$ content is preferably 8 percent, more preferably 6 percent, and still more preferably, 4 percent.

The $Y^{3+}$ content can be equal to or greater than 0 percent. From the perspective of raising the refractive index without increasing the $\Delta Pg$, F value, the lower limit of the $Y^{3+}$ content is desirably 0.1 percent, preferably 0.5 percent, more preferably 0.8 percent, still more preferably 1.0 percent, and yet more preferably, 2.0 percent.

$Ti^{4+}$ and $W^{6+}$ are components that serve to raise the refractive index.

$Nb^{5+}$ is a component that serves to raise the refractive index, and has the effect of reducing the $\Delta Pg$, F value more than $Ti^{4+}$ or $W^{6+}$.

$Ta^{5+}$ is an effective component for enhancing the stability of the glass in a high-refractive-index, low-dispersion glass.

When the combined content of $Ti^{4+}$, $Nb^{5+}$, $Ta^{5+}$, and $W^{6+}$ exceeds 20 percent, the refractive index nd rises, both the Abbé number vd and glass stability decrease, and the liquidus temperature rises. At less than 7 percent, both the refractive index nd and the stability of the glass decrease, and the liquidus temperature rises. Accordingly, the combined content of $Ti^{4+}$, $Nb^{5+}$, $Ta^{5+}$, and $W^{6+}$ falls within a range of 7 to 20 percent. From the above perspectives, the upper limit of the combined content of $Ti^{4+}$, $Nb^{5+}$, $Ta^{5+}$, and $W^{6+}$ is desirably 18 percent, preferably 16 percent, more preferably 14 percent, and still more preferably, 12 percent. The lower limit is desirably 8 percent, preferably 9 percent.

From the perspective of raising the refractive index, $Ti^{4+}$ is desirably incorporated in a quantity of 1 percent or greater. From the above perspective, the lower limit of the $Ti^{4+}$ content is desirably 2 percent, preferably 3 percent, and more preferably, 4 percent.

From the perspectives of increasing the $\Delta Pg$, F value and inhibiting a drop in the stability of the glass and coloration of the glass, the $Ti^{4+}$ content is desirably 10 percent or less. The upper limit of the $Ti^{4+}$ content is preferably 9 percent, more preferably 8 percent, still more preferably 7 percent, and yet more preferably, 6 percent.

From the perspectives of inhibiting a decrease in the Abbé number and a rise in the liquidus temperature while maintaining the stability of the glass, the $Nb^{5+}$ content is desirably equal to or lower than 10 percent. The upper limit of the $Nb^{5+}$ content is preferably 8 percent, more preferably 6 percent, still more preferably 5 percent, and yet more preferably, 4 percent.

The $Nb^{5+}$ content can be equal to or greater than 0 percent. From the perspective of raising the refractive index, the lower limit is preferably 0.5 percent, more preferably 1.0 percent, still more preferably 2.0 percent, and yet more preferably, 3.0 percent.

As set forth above, $Ta^{5+}$ is an effective component for improving the stability of the glass in high-refractive-index, low-dispersion glasses. However, because it is both rare and extremely expensive as set forth above, it is desirable to reduce the quantity employed. The present inventors conducted extensive trial and error to that end. As a result, they discovered that it was possible to provide a high quality, high-refractive-index, low-dispersion glass while reducing the content of $Ta^{5+}$. This was primarily achieved by balancing the quantity of $Ta^{5+}$ incorporated with the quantities of $Gd^{3+}$, $Ti^{4+}$, $Nb^{3+}$, and $W^{6+}$ incorporated, as set forth above, and by controlling the cation ratio of the content of $Zn^{2+}$ to the content of $Gd^{3+}$, set forth further below. Thus, it was possible to reduce the quantity of $Ta^{5+}$ incorporated to equal to or lower than 4 percent, equal to or lower than 3 percent, equal to or lower than 2.5 percent, equal to or lower than 2.0 percent, equal to or lower than 1.5 percent, or even 0 percent, by means of the present invention.

The $W^{6+}$ content can be equal to or greater than 0 percent. From the perspectives of increasing the $\Delta Pg$, F value and specific gravity, and inhibiting coloration of the glass while maintaining the stability of the glass, the $W^6$ content is desirably equal to or lower than 10 percent. From the above perspective, the upper limit of the $W^{6+}$ content is preferably 8 percent, more preferably 6 percent, still more preferably 4 percent, yet more preferably 2 percent, and yet still more preferably, no $W^{6+}$ is incorporated.

$Zr^{4+}$ is an essential component that serves to raise the refractive index and is incorporated in a content of equal to or greater than 2 percent. When the content of $Zr^{4+}$ exceeds 8 percent, the stability of the glass decreases and the liquidus temperature rises. Accordingly, the $Zr^{4+}$ content is equal to or lower than 8 percent. From the above perspective, the upper limit of $Zr^{4+}$ is desirably 7 percent, preferably 6 percent. The lower limit is desirably 3 percent, preferably 4 percent.

$Zn^{2+}$ is a component that enhances meltability while maintaining a high refractive index. However, when $Zn^{2+}$ is incorporated in a quantity of greater than 10 percent, there are problems in that it becomes difficult to achieve a high-refractive-index, the viscosity of the glass decreases, the glass transition temperature drops, the stability of the glass decreases, and the like. Thus, the $Zn^{2+}$ content is set to 0 to 10 percent. The upper limit of the $Zn^{2+}$ content is desirably 8 percent, preferably 6 percent, more preferably 5 percent, still more preferably 4 percent, and yet more preferably, 3 percent. From the perspective of improving meltability, the lower limit is desirably 0.1 percent, preferably 0.5 percent, more preferably 0.8 percent, and still more preferably, 1.0 percent.

The quantity of $Ta^{5+}$ introduced is desirably decreased as set forth above. However, $Ta^{5+}$ is a component that contributes to enhancing the stability of the glass in a high-refractive-index, low-dispersion glass. Simply reducing the quantity of $Ta^{5+}$ introduced causes the glass to tend to crystallize, making it difficult to achieve both high refractive index and low dispersion characteristics with glass stability.

By contrast, the present invention makes it possible to achieve a high-refractive-index, low-dispersion glass of high glass stability while decreasing the quantity of $Ta^{5+}$ introduced by keeping the cation ratio of the content of $Gd^{3+}$ to the combined content of $Ti^{4+}$, $Nb^{5+}$, $Ta^{5+}$, and $W^{6+}$ ($Gd^{3+}/(Ti^{4+}+Nb^{5+}+Ta^{5+}+W^{6+})$) to within a range of 0.65 to 2.00 and keeping the ratio of $Zn^{2+}$ to $Gd^{3+}$ ($Zn^{2+}/(Gd^{3+})$) to within a range of 0 to 0.80.

Further, when the cation ratio of ($Gd^{3+}/(Ti^{4+}+Nb^{5+}+Ta^{5+}+W^{6+})$) falls outside the above-stated range, vitrification tends not to occur. Even when vitrification is achieved, at greater than 2.00, it becomes difficult to achieve a high refractive index while maintaining the desired characteristics. At below 0.65, it becomes difficult to achieve a low dispersion characteristic. Keeping the cation ratio ($Zn^{2+}/Gd^{3+}$) within the range of 0 to 0.80 can raise the glass viscosity and inhibit crystallization. However, when 0.80 is exceeded, crystallization tends to increase and vitrification tends not to occur.

To more effectively achieve both high-refractive-index, low dispersion characteristics and glass stability while keeping down the quantity of $Ta^{5+}$ incorporated, the upper limit of the cation ratio ($Gd^{3+}/(Ti^{4+}+Nb^{5+}+Ta^{5+}+W^{6+})$) is desirably 1.80, preferably 1.60, more preferably 1.50, still more preferably 1.40, still more preferably 1.30, and yet still more preferably, 1.20. The lower limit is desirably 0.70, preferably 0.80, more preferably 0.90, still more preferably 1.00. The upper limit of the cation ratio ($Zn^{2+}/Gd^{3+}$) is desirably 0.70, preferably 0.60, more preferably 0.50, still more preferably 0.40, and yet more preferably, 0.30. The lower limit is desirably 0.01, preferably 0.05, more preferably 0.10, and still more preferably, 0.13.

$Ta^{5+}$ exhibits the lowest dispersion among the components $Ti^{4+}$, $Nb^{5+}$, $Ta^{5+}$, and $W^{6+}$ that contribute to a high-refractive-index, making it the most effective component for obtaining a high-refractive-index, low dispersion glass. However, when the cation ratio of the $Ta^{5+}$ content to the combined content of $Ti^{4+}$, $Nb^{5+}$, $Ta^{5+}$, and $W^{6+}$ ($Ta^{5+}/(Ti^{4+}+Nb^{5+}+Ta^{5+}+W^{6+})$) exceeds 0.30, the refractive index drops and the specific gravity increases. Thus, this cation ratio is set to the range of 0 to 0.30. Further, due to the high cost of $Ta^{5+}$ as set forth above, it is also desirable to keep the cation ratio of the $Ta^{5+}$ content to the combined content of $Ti^{4+}$, $Nb^{5+}$, $Ta^{5+}$, and $W^{6+}$ to equal to or lower than 0.30 from the perspective of keeping costs down. The upper limit of the cation ratio ($Ta^{5+}/(Ti^{4+}+Nb^{5+}+Ta^{5+}+W^{6+})$) is desirably 0.28, preferably 0.26, more preferably 0.24, still more preferably 0.22, yet more preferably 0.20, and yet still more preferably 0.18. From the perspective of greatly increasing the stability of the glass by adding such a small quantity of $Ta^{5+}$, the lower limit of the cation ratio ($Ta^{5+}/(Ti^{4+}+Nb^{5+}+Ta^{5+}+W^{6+})$) is desirably 0.01, preferably 0.05.

$Ti^{4+}$ exhibits the highest dispersion among the components $Ti^{4+}$, $Nb^{5+}$, $Ta^{5+}$, and $W^{6+}$ that contribute to a high refractive index. However, it is the most inexpensive. Accordingly, $Ti^{4+}$ is desirably effectively employed to provide an inexpensive glass material. Accordingly, in the present invention, the cation ratio of the $Ti^{4+}$ content to the combined content of $Ti^{4+}$, $Nb^{5+}$, $Ta^{5+}$, and $W^{6+}$ ($Ti^{4+}/(Ti^{4+}+Nb^{5+}+Ta^{5+}+W^{6+})$) is set to equal to or greater than 0.30 to provide an inexpensive high-refractive-index, low-dispersion glass. However, when $Ti^{4+}$ is incorporated in a quantity, causing this cation ratio to exceed 0.90, the stability of the glass decreases. Thus, this cation ratio is set to equal to or lower than 0.90. The upper limit of the cation ratio ($Ti^{4+}/(Ti^{4+}+Nb^{5+}+Ta^{5+}+W^{6+})$) is desirably 0.80, preferably 0.70, more preferably 0.65, and still more preferably 0.60. The lower limit is desirably 0.35, preferably 0.40, more preferably 0.45, and still more preferably 0.50.

Additional components will be described below.

$Li^+$, $Na^+$, and $K^+$ are all components that have the effect of improving meltability. The content of each of $Li^+$, $Na^+$, and $K^+$ can be equal to or greater than 0 percent.

From the perspective of preventing drops in the refractive index and glass stability, the content of each is desirably equal to or lower than 10 percent. From the above perspective, the upper limit of the content of each of $Li^+$, $Na^+$, and $K^+$ is preferably 6 percent, more preferably 4 percent, and still more preferably, 2 percent. It is yet more preferable not to incorporate any $Li^+$, $Na^+$, or $K^+$.

The contents of $Li^+$, $Na^+$, and $K^+$ are as set forth above. However, from the perspective of preventing a drop in the refractive index and glass stability, the combined content of $Li^+$, $Na^+$, and $K^+$ is desirably 0 to 10 percent. The upper limit of the combined content of $Li^+$, $Na^+$, and $K^+$ is preferably 8 percent, more preferably 6 percent, still more preferably 4 percent, yet more preferably 2 percent, yet still more preferably 1 percent, and even more preferably, 0.5 percent. As set forth above, it is yet even more preferable not to incorporate any $Li^+$, $Na^+$, or $K^+$.

$Mg^{2+}$ is a component that serves to enhance meltability and has the effect of lowering the specific gravity. The $Mg^{2+}$ content can be equal to or greater than 0 percent.

From the perspectives of preventing raising the Abbé number and liquidus temperature, and a drop in the stability of the glass, the $Mg^{2+}$ content is desirably equal to or lower than 10 percent. From the above perspective, the upper limit of the $Mg^{2+}$ content is desirably 6 percent, preferably 4 percent, more preferably 2 percent, still more preferably 1 percent, and yet more preferably, 0.5 percent. It is yet still more preferable for no $Mg^{2+}$ to be contained.

$Ca^{2+}$ is a component that serves to enhance meltability and has the effect of lowering the specific gravity of the glass. The $Ca^{2+}$ content can be equal to or greater than 0 percent.

From the perspectives of preventing raising the Abbé number and liquidus temperature, and a drop in the stability of the glass, the $Ca^{2+}$ content is desirably equal to or lower than 10 percent. From the above perspective, the upper limit of the $Ca^{2+}$ content is desirably 6 percent, preferably 4 percent, more preferably 2 percent, still more preferably 1 percent, and yet more preferably, 0.5 percent. It is yet still more preferable for no $Ca^{2+}$ to be contained.

$Sr^{2+}$ is a component that serves to enhance meltability and has the effect of increasing the stability of the glass. The $Sr^{2+}$ content can be equal to or greater than 0 percent.

From the perspectives of preventing raising the Abbé number and a drop in the stability of the glass, the $Sr^{2+}$ content is desirably equal to or lower than 10 percent. From the above perspective, the upper limit of the $Sr^{2+}$ content is desirably 6 percent, preferably 4 percent, more preferably 2 percent, still more preferably 1 percent, and yet more preferably, 0.5 percent. It is yet still more preferable for no $Sr^{2+}$ to be contained.

$Ba^{2+}$ is also a component that serves to enhance meltability and has the effect of raising the stability of the glass. The $Ba^{2+}$ content is 0 percent or greater.

From the perspectives of raising the Abbé number and liquidus temperature and preventing a drop in the stability of the glass, the $Ba^{2+}$ content is desirably 10 percent or lower. From the above perspective, the upper limit of the $Ba^{2+}$ content is desirably 6 percent, preferably 4 percent, more preferably 2 percent, still more preferably 1 percent, and yet more preferably, 0.5 percent. It is yet still more preferable for no $Ba^{2+}$ to be contained.

The contents of $Mg^{2+}$, $Ca^{2+}$, $Sr^{2+}$, and $Ba^{2+}$ are as set forth above. However, from the perspectives of preventing a drop in the refractive index and glass stability, the combined content of $Mg^{2+}$, $Ca^{2+}$, $Sr^{2+}$, and $Ba^{2+}$ is desirably equal to or lower than 10 percent. The upper limit of the combined content of $Mg^{2+}$, $Ca^{2+}$, $Sr^{2+}$, and $Ba^{2+}$ is preferably 8 percent, more preferably 6 percent, still more preferably 4 percent, yet more preferably 2 percent, yet still more preferably 1 percent, and even more preferably, 0.5 percent. As set forth above, it is yet even more preferable not to incorporate any $Mg^{2+}$, $Ca^{2+}$, $Sr^{2+}$, or $Ba^{2+}$.

$Yb^{3+}$ is a component that raises the refractive index without increasing the $\Delta Pg$, F value. The $Yb^{3+}$ content can be equal to or greater than 0 percent.

From the perspectives of preventing rises in the liquidus temperature and specific gravity while maintaining glass stability, the $Yb^{3+}$ content is desirably equal to or lower than 10 percent. The upper limit of the $Yb^{3+}$ content is preferably 6 percent, more preferably 4 percent, still more preferably 2 percent, yet more preferably 1 percent, and yet still more preferably, 0.5 percent. Not incorporating any $Yb^{3+}$ is even more preferable.

$Te^{4+}$ is a component that serves both to raise the refractive index and enhance the stability of the glass. The $Te^{4+}$ content can be equal to or greater than 0 percent.

From the perspective of maintaining the stability of the glass, the $Te^{4+}$ content is desirably equal to or lower than 10 percent. The upper limit of the $Te^{4+}$ content is desirably 6 percent, preferably 4 percent, more preferably 2 percent, still more preferably 1 percent, and yet more preferably, 0.5 percent. Out of concern for the environment, it is desirable to reduce the content of $Te^{4+}$; not incorporating any $Tb^{4+}$ at all is yet still more preferable.

$Ge^{4+}$ is a component that serves to raise the refractive index and enhance the stability of the glass. The $Ge^{4+}$ content can be equal to or greater than 0 percent.

From the perspective of maintaining the stability of the glass, the $Ge^{4+}$ content is desirably equal to or lower than 10 percent. $Ge^{4+}$ is an extremely expensive component among substances employed as glass components. Thus, from the perspective of keeping down manufacturing costs, the quantity employed is desirably kept low. Accordingly, the upper limit of the $Ge^{4+}$ content is desirably 6 percent, preferably 4 percent, more preferably 2 percent, still more preferably 1 percent, yet more preferably 0.5 percent, and yet still more preferably, no $Ge^{4+}$ is incorporated at all.

$Bi^{3+}$ is a component that serves to raise the refractive index and enhance the stability of the glass. The $Bi^{4+}$ content can be equal to or greater than 0 percent.

From the perspectives of preventing a drop in the stability of the glass and preventing coloration, the $Bi^{3+}$ content is desirably equal to or lower than 10 percent. The upper limit of the $Bi^{3+}$ content is preferably 6 percent, more preferably 4 percent, still more preferably 2 percent, yet more preferably 1 percent, yet still more preferably 0.5 percent, and even more preferably, no $Bi^{3+}$ is incorporated at all.

$Al^{3+}$ is a component that serves to enhance the stability and chemical durability of the glass. The $Al^{3+}$ content can be equal to or greater than 0 percent.

From the perspectives of inhibiting drops in the refractive index and glass stability, the $Al^{3+}$ content is desirably equal to or lower than 10 percent. The upper limit of the $Al^{3+}$ content is desirably 6 percent, preferably 4 percent, more preferably 2 percent, still more preferably 1 percent, yet more preferably 0.5 percent, and yet still more preferably, no $Al^{3+}$ is incorporated at all.

In the optical glass of the present invention, clarifying agents such as Sb and Sn can be added in addition to the above components. In that case, the quantity of Sb added, as a ratio relative to the combined total and converted to $Sb_2O_3$, is desirably 0 to 1 mass percent, preferably 0 to 0.5 mass percent, and the quantity of Sn added, as a ratio relative to the combined total and converted to $SnO_2$, is desirably 0 to 1 mass percent, preferably 0 to 0.5 mass percent.

An example of a desirable glass composition for an optical glass according to an aspect of the present invention, denoted as cation percentages, contains:

$Si^{4+}$ 6 to 15 percent;
$B^{3+}$ 25 to 45 percent;
$Li^+$ 0 to 10 percent;
$Na^+$ 0 to 10 percent;
$K^+$ 0 to 10 percent;
$Mg^{2+}$ 0 to 10 percent;
$Ca^{2+}$ 0 to 10 percent;
$Sr^{2+}$ 0 to 10 percent;
$Ba^{2+}$ 0 to 10 percent;
$Zn^{2+}$ 0 to 10 percent;
$La^{3+}$ 15 to 30 percent;
$Gd^{3+}$ 5 to 20 percent;
$Y^{3+}$ 0 to 10 percent;
$Yb^{3+}$ 0 to 10 percent;
$Zr^{4+}$ 2 to 8 percent;
$Ti^{4+}$ 1 to 10 percent;
$Nb^{5+}$ 0 to 10 percent;
$Ta^{5+}$ 0 to 4 percent;
$W^{6+}$ 0 to 10 percent;
$Te^{4+}$ 0 to 10 percent;
$Ge^{4+}$ 0 to 10 percent;
$Bi^{3+}$ 0 to 10 percent;
$Al^{3+}$ 0 to 10 percent;
a combined content of $Si^{4+}$ and $B^{3+}$ falling within a range of 35 to 55 percent;
a combined content of $Li^+$, $Na^+$, and $K^+$ falling within a range of 0 to 10 percent;
a combined content of $Mg^{2+}$, $Ca^{2+}$, $Sr^{2+}$, and $Ba^{2+}$ falling within a range of 0 to 10 percent;
a combined content of $La^{3+}$, $Gd^{3+}$, and $Y^{3+}$ falling within a range of 30 to 55; and
a combined content of $Ti^{4+}$, $Nb^{5+}$, $Ta^{5+}$ and $W^{6+}$ falling within a range of 7 to 20 percent;
wherein the cation ratio of the $Zn^{2+}$ content to the $Gd^{3+}$ content ($Zn^{2+}/Gd^{3+}$) falls within a range of 0 to 0.80;
the cation ratio of the $Gd^{3+}$ content to the combined content of $Ti^{4+}$, $Nb^{5+}$, $Ta^{5+}$, and $W^{6+}$ ($Gd^{3+}/(Ti^{4+}+Nb^{5+}+Ta^{5+}+W^6)$) falls within a range of 0.65 to 2.00;
the cation ratio of the $Ta^{5+}$ content to the combined content of $Ti^{4+}$, $Nb^{5+}$, $Ta^{5+}$, and $W^{6+}$ ($Ta^{5+}/(Ti^{4+}+Nb^{5+}+Ta^{5+}+W^{6+})$) falls within a range of 0 to 0.30; and
the cation ratio of the $Ti^{4+}$ content to the combined content of $Ti^{4+}$, $Nb^{5+}$, $Ta^{5+}$, and $W^{6+}$ ($Ta^{5+}/(Ti^{4+}+Nb^{5+}+Ta^{5+}+W^{6+})$) falls within a range of 0.30 to 0.90.

The glass of the present invention is an optical glass, and little coloration is desirable. Accordingly, V, Cr, Mn, Cu, Ni, Fe, Pr, Nd, Eu, Tb, Ho, and Er, which color the glass, are desirably not incorporated. To reduce the load on the environment, Pb, Cd, Th, U, Tl, Se, and As are also desirably not incorporated.

The incorporation of trace amounts of $Ga^{3+}$, $Lu^{3+}$, $In^{3+}$, and $Hf^{4+}$ does not matter. Since these components do not yield significant effects and are all expensive, the content of each is desirably kept to within a range of 0 to 2 percent, preferably to within a range of 0 to 1 percent, more preferably to within a range of 0 percent to less than 0.5 percent, and still more preferably, to within a range of 0 percent to less than 0.1 percent. Yet more preferably, none at all is incorporated to keep down cost.

In the present invention, the team "does not contain" or "is not incorporated" means that none is added as a glass component. However, this does not exclude the mixing of these components into the glass at the level of unavoidable impurities or the like. It suffices to quantify the content of each glass component by a known quantification method such as inductively-coupled plasma-atomic emission spectrometry (ICP-AES) or ion chromatography.

Refractive Index and Abbé number

The refractive index nd of the optical glass according to an aspect of the present invention is 1.890 to 1.950. Having a refractive index nd of equal to or higher than 1.890 makes it possible to provide an optical element constituting an optical system that is highly functional and compact using the optical glass of the present invention. However, when the refractive index of a high refractive index optical glass is raised, the liquidus temperature and glass transition temperature tend to rise, compromising manufacturing suitability. Thus, in the present invention, the upper limit of the refractive index nd is set to 1.950, thereby maintaining glass manufacturing stability and moldability.

The upper limit of the refractive index nd is desirably 1.940, preferably 1.930, more preferably 1.920, still more preferably 1.915, and yet more preferably, 1.910.

The lower limit of the refractive index nd is desirably 1.893, preferably 1.895, and more preferably, 1.897.

In the optical glass of the present invention, in addition to a refractive index falling within the above range, the Abbé number νd satisfies the relation νd≥(2.334−nd)/0.012 with respect to the refractive index nd, and is equal to or lower than 39.0. Having an Abbé number νd falling within the above range makes it possible to combine optical elements comprised of a variety of optical glasses to obtain a good chromatic aberration correction function.

The upper limit of the Abbé number νd is desirably 38.5, preferably 38.0, and more preferably, 37.5.

The Abbé number νd satisfies the relation νd≥(2.334−nd)/0.012 as set forth above, desirably satisfies the relation νd≥(2.445−nd)/0.015, preferably satisfies the relation νd≥(2.630−nd)/0.020, more preferably satisfies the relation νd≥(3.000−nd)/0.030, and still more preferably satisfies the relation νd≥(4.110−nd)/0.060. Having an Abbé number νd that satisfies the above relational expression indicates that the optical glass of the present invention is a high-refractive-index, low dispersion glass that was conventionally difficult to achieve without incorporating a large quantity of $Ta_2O_5$.

Glass Transition Temperature

A glass with a high glass transition temperature Tg will readily vitrify and be highly stable in the atmosphere. According to the present invention, it is possible to achieve a glass transition temperature of equal to or higher than 650° C. in a high-refractive-index, low-dispersion optical glass that is of high stability. That is, the glass transition temperature Tg of the optical glass according to an aspect of the present invention is desirably equal to or higher than 650° C. The glass transition temperature Tg is preferably equal to or higher than 660° C., more preferably equal to or higher than 670° C., still more preferably equal to or higher than 680° C., yet more preferably equal to or higher than 690° C., and yet still more preferably, equal to or higher than 695° C. From the perspective of achieving good press moldability by preventing a rise in the temperature of the glass and the pressing mold during press molding, the glass transition temperature Tg is desirably equal to or lower than 800° C., preferably equal to or lower than 780° C., more preferably equal to or lower than 770° C., still more preferably equal to or lower than 760° C., and yet more preferably, equal to or lower than 750° C.

Partial Dispersion

In image pickup optical systems, projection optical systems, and the like, it is effective to combine a lens comprised of a high-dispersion glass with a lens comprised of the optical glass of the present invention to conduct high-order chromatic aberration correction. In relatively high-order chromatic aberration correction, a low-dispersion glass with a low partial dispersion ratio is desirable.

The partial dispersion ratio Pg, F is denoted as (ng−nF)/(nF−nc) using the various refractive indexes ng, nF, and nc of the g line, F line, and c line.

In the optical glass according to an aspect of the present invention, to provide a glass suited to high-order chromatic aberration correction, the partial dispersion ratio Pg, F is desirably equal to or lower than 0.600. The Pg, F is preferably equal to or lower than 0.598, more preferably equal to or lower than 0.596, more preferably equal to or lower than 0.594, still more preferably equal to or lower than 0.592, yet more preferably equal to or lower than 0.590, and yet still more preferably, equal to or lower than 0.585.

However, when the partial dispersion ratio Pg, F is reduced excessively, other characteristics tend to depart from the desirable ranges. Thus, the partial dispersion ratio Pg, F is desirably equal to or higher than 0.560. The lower limit of the partial dispersion ratio Pg, F is preferably 0.564, more preferably 0.566, still more preferably 0.568, yet more preferably 0.570, and yet still more preferably, 0.575.

In a plot of the Pg, F-Abbé number νd, denoting the partial dispersion ratio on the normal line serving as a reference for a normal partial dispersion glass as Pg, F(0), Pg, F(0) can be represented by the following equation using the Abbé number νd:

$$Pg, F(0) = 0.6483 - (0.0018 \times \nu d)$$

ΔPg, F is the deviation of the partial dispersion ratio Pg, F from the above normal line, and can be denoted by the following equation:

$$\Delta Pg, F = Pg, F - Pg, F(0)$$
$$= Pg, F + (0.0018 \times \nu d) - 0.6483$$

In a desirable embodiment of the optical glass according to an aspect of the present invention, the deviation ΔPg, F is equal to or lower than 0.01, rendering it suitable as an optical element material for use in high-order chromatic aberration correction. ΔPg, F in the present invention desirably falls within a range of equal to or lower than 0.008, preferably within a range of equal to or lower than 0.006, more preferably within a range of equal to or lower than 0.004, still more preferably within a range of equal to or lower than 0.002, and yet more preferably, within a range of equal to or lower than 0.000. The lower limit of the deviation ΔPg, F is desirably −0.01, preferably −0.008, more preferably −0.006, and still more preferably, −0.005.

Specific Gravity

The optical glass according to an aspect of the present invention is a high-refractive-index glass having a refractive index nd falling within a range of from 1.890 to 1.950. Generally, high-refractive-index glasses tend to exhibit increased specific gravity. However, increased specific gravity is undesirable because it invites an increase in the weight of optical elements. By contrast, the optical glass according to an aspect of the present invention is of the above glass composition, thereby making it possible to achieve a specific gravity of, for example, equal to or lower than 5.50 in a high-refractiveindex glass. Excessive reduction of the specific gravity reduces the stability of the glass and tends to raise the liquidus temperature. Thus, the specific gravity is desirably equal to or higher than 4.50. That is, the specific gravity of the optical glass according to an aspect of the present invention desirably has a specific gravity falling within a range of 4.50 to 5.50. The upper limit of the specific gravity is preferably 5.40, more preferably 5.35, still more preferably 5.30, yet more preferably 4.70, and yet still more preferably, 4.80. The lower limit is preferably 4.90, more preferably 5.00, and still more preferably, 5.10.

Liquidus Temperature

The optical glass according to an aspect of the present invention is of the above glass composition, and thus can exhibit a liquidus temperature of equal to or lower than 1,300° C. That makes it possible to prevent a rise in the melting temperature and the outflow temperature of the glass melt, thereby making it possible to achieve a high refractive index and high homogeneity, and to prevent coloration. The upper limit of the liquidus temperature is preferably 1,250° C., more preferably 1,240° C., and still more preferably, 1,230° C.

When the liquidus temperature is lowered excessively, it tends to become difficult to achieve the desired refractive index and Abbé number, and the partial dispersion ratio Pg, F value tends to rise. Thus, the liquidus temperature is desirably equal to or higher than 1,150° C. The lower limit of the liquidus temperature is preferably 1,160° C., more preferably 1,170° C., still more preferably 1,180° C., yet more preferably 1,190° C., and yet still more preferably, 1,200° C.

Coloration ($\lambda 70$, $\lambda 5$)

In the optical glass according to an aspect of the present invention, it is possible to inhibit or prevent coloration by means of the above glass composition, thereby achieving a high degree of transparency over a broad range in the visible light region. The wavelength $\lambda 70$ at which light transmittance over the wavelength range of 280 to 700 nm reaches 70 percent and the wavelength $\lambda 5$ at which this light transmittance reaches 5 percent can be employed as indexes of the coloration of an optical glass. In this context, the term "light transmittance" refers to the spectral transmittance obtained by causing light to enter from a direction perpendicular to the polished surfaces of a glass sample having two mutually parallel surfaces that have been polished to a thickness of 10.0±0.1 mm, that is, the value of $I_{out}/I_{in}$ where $I_{in}$ denotes the intensity of the light entering the sample and $I_{out}$ denotes the intensity of light that has passed through the sample. The spectral transmittance includes the loss of light reflecting off the sample surface. The above-mentioned "polishing" means that the surface roughness has been adequately reduced relative to wavelengths in the wavelength range at which measurement is conducted. The $\lambda 70$ can be, for example, a $\lambda 70$ of equal to or lower than 450 nm that is exhibited by the optical glass according to an aspect of the present invention. The $\lambda 70$ of the optical glass according to an aspect of the present invention is desirably equal to or lower than 440 nm, preferably equal to or lower than 430 nm, and more preferably, equal to or lower than 420 nm. However, when the $\lambda 70$ becomes excessively low, it becomes difficult to satisfy the desired optical characteristics, the stability of the glass diminishes, and the liquidus temperature sometimes tends to rise. Thus, the $\lambda 70$ is desirably equal to or higher than 350 nm, preferably equal to or higher than 360 nm, more preferably equal to or higher than 370 nm, still more preferably equal to or higher than 380 nm, and yet more preferably, equal to or higher than 390 nm.

Further, the $\lambda 5$ of the optical glass according to an aspect of the present invention desirably falls within a range of equal to or lower than 370 nm, preferably within a range of equal to or lower than 365 nm, more preferably within a range of equal to or lower than 360 nm, still more preferably within a range of equal to or lower than 355 nm, and yet more preferably, within a range of equal to or lower than 350.

The optical glass according to an aspect of the present invention thus exhibits good optical transmittance while being a high-refractive-index glass, and is suitable as a material for the optical elements constituting image pickup and projection optical systems.

Method of Manufacturing an Optical Glass

The optical glass according to an aspect of the present invention can be manufactured by the melt method. In the melt method, starting materials in the form of oxides and various salts are weighed out in a manner that will yield a glass of the desired composition and optical characteristics and thoroughly mixed to obtain a blended starting material. The blended starting material is heated and melted to obtain a melt. The melt is clarified and homogenized, and then caused to flow out to obtain molded articles comprised of homogenous glass. Alternatively, the blended starting material can be charged to a crucible and vitrified by being crudely melted to fabricate cullet starting materials. These cullet starting materials can then be blended, heated, and melted to obtain an optical glass of desired optical characteristics. The melt obtained can then be clarified and homogenized, and then caused to flow out to obtain molded articles comprised of homogenous optical glass.

[Press-Molding Glass Material]

The press-molding glass material according to an aspect of the present invention (referred to as a "glass material", hereinafter) is comprised of the above optical glass.

The glass material is fabricated by first heating, melting, and molding a blended glass starting material in such a manner as to obtain the above optical glass. The molded glass article thus fabricated is processed to fabricate a glass material corresponding to the weight of one press-molded product.

As an example, the glass melt is cast into a mold to mold it into the form of a sheet or block, annealed, and machined by means of cutting, grinding, and polishing to obtain a glass material.

Alternatively, the glass melt can be caused to flow out of a pipe, a gob of glass melt corresponding to the weight of a single press-molded article can be separated from the front end of the glass melt flow, and the glass melt gob can be molded into a glass material on a forming mold. In that case, it suffices to mold the glass material while it is being floated by wind pressure on the forming mold, or press molding the glass melt gob on the forming mold, cooling it while it is being floated by wind pressure, to fabricate a glass material.

[Optical Element and Method of Manufacturing the Same]

The optical element according to an aspect of the present invention is comprised of the optical glass set forth above.

Specific examples of optical elements according to an aspect of the present invention are lenses such as aspherical lenses, spherical lenses, plano-concave lenses, plano-convex lenses, biconcave lenses, biconvex lenses, convex meniscus lenses, and concave meniscus lenses; various other lenses such as microlenses, lens arrays, and lenses with diffraction gratings; prisms; and prisms with lens functions. Antireflective films, wavelength-selective partially antireflective films, and the like can be provided as needed on the surface.

The optical element according to an aspect of the present invention can afford both a high refractive index and a low partial dispersion ratio. Thus, when combined with an optical element comprised of another glass, good chromatic aberration correction can be achieved. Because the optical glass according to an aspect of the present invention can afford both a high refractive index and a low specific gravity, it makes it possible to reduce the weight of optical elements based on the optical glass according to an aspect of the present invention. The optical element according to an aspect of the present invention is suited to the image pickup optical systems of various cameras such as digital still cameras, digital video cameras, monitor cameras, and vehicle-mounted cameras, and optical elements guiding optical beams to read and write data to and from optical recording media such as DVDs and CDs, such as optical pickup lenses and collimator lenses. It is also suited to the optical elements employed in optical communication.

In the method of manufacturing an optical element according to an aspect of the present invention, the above press-molding glass material is heated, softened, and press molded to fabricate a molded glass article, and the molded glass article is processed to obtain an optical element.

The molded glass article is an optical element blank having the shape of a targeted optical element to which processing margins (a grinding margin, polishing margin, and the like) are added. The optical element blank is ground and polished to fabricate the targeted optical element. The optical element according to an aspect of the present invention can be fabricated by grinding and polishing the molded glass article comprised of the above-described optical glass.

EXAMPLES

The present invention will be described in greater detail below through Examples.

Examples 1 to 30

1. Fabrication of Optical Glass

Starting materials in the form of various corresponding oxides, carbonates, sulfates, nitrates, hydroxides, and the like were suitably weighed out to incorporate the various components and achieve the glass compositions indicated in Table 1. In each case, these components were then thoroughly mixed to obtain a blended starting material, which was charged to a platinum crucible, heated to 1,200 to 1,450° C. for 1 to 3 hours, melted, clarified, and homogenized. The glass melt thus obtained was caused to flow into a mold made of carbon, cooled to the glass transition temperature, and then immediately charged to an annealing furnace. There, it was annealed for about one hour at the glass transition temperature range and then cooled to room temperature within the furnace, yielding an optical glass.

TABLE 1

| | | $Si^{4+}$ | $B^{3+}$ | $Li^+$ | $Na^+$ | $K^+$ | $Mg^{2+}$ | $Ca^{2+}$ | $Sr^{2+}$ | $Ba^{2+}$ | $Zn^{2+}$ | $La^{3+}$ |
|---|---|---|---|---|---|---|---|---|---|---|---|---|
| Ex. 1 | cation % | 10.31 | 33.76 | 0.00 | 0.00 | 0.00 | 0.00 | 0.00 | 0.00 | 0.00 | 2.95 | 24.72 |
| Ex. 2 | cation % | 10.31 | 34.76 | 0.00 | 0.00 | 0.00 | 0.00 | 0.00 | 0.00 | 0.00 | 2.95 | 24.72 |
| Ex. 3 | cation % | 10.31 | 34.52 | 0.00 | 0.00 | 0.00 | 0.00 | 0.00 | 0.00 | 0.00 | 2.95 | 24.72 |
| Ex. 4 | cation % | 10.31 | 34.52 | 0.00 | 0.00 | 0.00 | 0.00 | 0.00 | 0.00 | 0.00 | 2.95 | 24.72 |
| Ex. 5 | cation % | 10.36 | 34.70 | 0.00 | 0.00 | 0.00 | 0.00 | 0.00 | 0.00 | 0.00 | 2.96 | 20.82 |
| Ex. 6 | cation % | 10.36 | 35.20 | 0.00 | 0.00 | 0.00 | 0.00 | 0.00 | 0.00 | 0.00 | 2.46 | 22.83 |
| Ex. 7 | cation % | 10.36 | 35.20 | 0.00 | 0.00 | 0.00 | 0.00 | 0.00 | 0.00 | 0.00 | 2.46 | 22.83 |
| Ex. 8 | cation % | 10.36 | 35.71 | 0.00 | 0.00 | 0.00 | 0.00 | 0.00 | 0.00 | 0.00 | 1.96 | 22.83 |
| Ex. 9 | cation % | 10.36 | 36.21 | 0.00 | 0.00 | 0.00 | 0.00 | 0.00 | 0.00 | 0.00 | 1.46 | 23.50 |
| Ex. 10 | cation % | 10.36 | 36.21 | 0.00 | 0.00 | 0.00 | 0.00 | 0.00 | 0.00 | 0.00 | 1.46 | 23.50 |
| Ex. 11 | cation % | 10.36 | 36.21 | 0.00 | 0.00 | 0.00 | 0.00 | 0.00 | 0.00 | 0.00 | 1.46 | 24.01 |
| Ex. 12 | cation % | 10.86 | 35.21 | 0.00 | 0.00 | 0.00 | 0.00 | 0.50 | 0.00 | 0.00 | 1.46 | 23.84 |
| Ex. 13 | cation % | 10.81 | 35.52 | 0.00 | 0.00 | 0.00 | 0.00 | 0.00 | 0.00 | 0.50 | 1.45 | 23.72 |
| Ex. 14 | cation % | 10.36 | 35.21 | 0.00 | 0.00 | 0.00 | 0.50 | 0.00 | 0.00 | 0.00 | 1.96 | 22.83 |
| Ex. 15 | cation % | 10.41 | 34.80 | 0.00 | 0.00 | 0.00 | 0.00 | 0.00 | 0.00 | 0.00 | 2.47 | 23.06 |
| Ex. 16 | cation % | 10.41 | 35.30 | 0.00 | 0.00 | 0.00 | 0.00 | 0.00 | 0.00 | 0.00 | 1.72 | 22.96 |
| Ex. 17 | cation % | 10.41 | 35.05 | 0.00 | 0.00 | 0.00 | 0.00 | 0.00 | 0.00 | 0.00 | 1.72 | 23.06 |
| Ex. 18 | cation % | 10.41 | 34.80 | 1.00 | 0.00 | 0.00 | 0.00 | 0.00 | 0.00 | 0.00 | 1.47 | 23.06 |
| Ex. 19 | cation % | 10.41 | 34.80 | 0.00 | 1.00 | 0.00 | 0.00 | 0.00 | 0.00 | 0.00 | 1.47 | 23.06 |
| Ex. 20 | cation % | 10.41 | 34.80 | 0.00 | 0.00 | 1.00 | 0.00 | 0.00 | 0.00 | 0.00 | 1.47 | 23.06 |
| Ex. 21 | cation % | 10.30 | 34.45 | 0.00 | 0.00 | 0.00 | 0.00 | 0.00 | 0.00 | 0.00 | 2.45 | 22.83 |
| Ex. 22 | cation % | 10.41 | 34.79 | 0.00 | 0.00 | 0.00 | 0.00 | 0.00 | 0.00 | 0.00 | 2.47 | 23.06 |
| Ex. 23 | cation % | 10.41 | 34.80 | 0.00 | 0.00 | 0.00 | 0.00 | 0.00 | 0.00 | 0.00 | 2.47 | 23.06 |
| Ex. 24 | cation % | 10.91 | 35.30 | 0.00 | 0.00 | 0.00 | 0.00 | 0.00 | 0.00 | 0.00 | 2.47 | 23.06 |
| Ex. 25 | cation % | 10.67 | 35.67 | 0.00 | 0.00 | 0.00 | 0.00 | 0.00 | 0.00 | 0.00 | 0.00 | 23.64 |
| Ex. 26 | cation % | 10.20 | 34.10 | 0.00 | 0.00 | 0.00 | 0.00 | 0.00 | 0.00 | 0.00 | 4.39 | 22.60 |
| Ex. 27 | cation % | 10.72 | 35.85 | 0.00 | 0.00 | 0.00 | 0.00 | 0.00 | 0.00 | 0.00 | 2.55 | 23.76 |
| Ex. 28 | cation % | 10.20 | 34.11 | 0.00 | 0.00 | 0.00 | 0.00 | 0.00 | 0.00 | 0.00 | 2.42 | 22.60 |
| Ex. 29 | cation % | 10.41 | 33.80 | 0.00 | 0.00 | 0.00 | 0.00 | 0.00 | 0.00 | 0.00 | 2.47 | 23.06 |
| Ex. 30 | cation % | 10.41 | 32.80 | 0.00 | 0.00 | 0.00 | 0.00 | 0.00 | 0.00 | 0.00 | 2.47 | 23.06 |

| | $Gd^{3+}$ | $Y^{3+}$ | $Yb^{3+}$ | $Zr^{4+}$ | $Ti^{4+}$ | $Nb^{5+}$ | $Ta^{5+}$ | $W^{8+}$ | $Te^{4+}$ | $Ge^{4+}$ | $Bi^{3+}$ | $Al^{3+}$ | Total |
|---|---|---|---|---|---|---|---|---|---|---|---|---|---|
| Ex. 1 | 9.33 | 2.73 | 0.00 | 4.74 | 5.55 | 2.78 | 2.37 | 0.76 | 0.00 | 0.00 | 0.00 | 0.00 | 100.00 |
| Ex. 2 | 9.33 | 2.73 | 0.00 | 4.74 | 5.55 | 1.78 | 2.37 | 0.76 | 0.00 | 0.00 | 0.00 | 0.00 | 100.00 |
| Ex. 3 | 9.33 | 2.73 | 0.00 | 4.74 | 6.05 | 2.28 | 2.37 | 0.00 | 0.00 | 0.00 | 0.00 | 0.00 | 100.00 |
| Ex. 4 | 9.33 | 2.73 | 0.00 | 4.74 | 4.05 | 4.28 | 2.37 | 0.00 | 0.00 | 0.00 | 0.00 | 0.00 | 100.00 |
| Ex. 5 | 13.40 | 2.74 | 0.00 | 4.76 | 5.58 | 2.80 | 1.88 | 0.00 | 0.00 | 0.00 | 0.00 | 0.00 | 100.00 |
| Ex. 6 | 11.39 | 2.74 | 0.00 | 4.76 | 6.08 | 2.80 | 1.38 | 0.00 | 0.00 | 0.00 | 0.00 | 0.00 | 100.00 |
| Ex. 7 | 11.39 | 2.74 | 0.00 | 4.76 | 5.58 | 3.30 | 1.38 | 0.00 | 0.00 | 0.00 | 0.00 | 0.00 | 100.00 |
| Ex. 8 | 11.39 | 2.74 | 0.00 | 4.76 | 5.58 | 3.80 | 0.87 | 0.00 | 0.00 | 0.00 | 0.00 | 0.00 | 100.00 |
| Ex. 9 | 11.72 | 1.74 | 0.00 | 4.76 | 6.08 | 3.80 | 0.37 | 0.00 | 0.00 | 0.00 | 0.00 | 0.00 | 100.00 |
| Ex. 10 | 11.72 | 1.74 | 0.00 | 4.76 | 5.58 | 4.30 | 0.37 | 0.00 | 0.00 | 0.00 | 0.00 | 0.00 | 100.00 |
| Ex. 11 | 11.97 | 0.98 | 0.00 | 4.76 | 5.58 | 4.30 | 0.37 | 0.00 | 0.00 | 0.00 | 0.00 | 0.00 | 100.00 |
| Ex. 12 | 11.89 | 1.23 | 0.00 | 4.76 | 5.58 | 4.30 | 0.37 | 0.00 | 0.00 | 0.00 | 0.00 | 0.00 | 100.00 |
| Ex. 13 | 11.83 | 1.23 | 0.00 | 4.74 | 5.55 | 4.28 | 0.37 | 0.00 | 0.00 | 0.00 | 0.00 | 0.00 | 100.00 |

TABLE 1-continued

| | | | | | | | | | | | | |
|---|---|---|---|---|---|---|---|---|---|---|---|---|
| Ex. 14 | 11.39 | 2.74 | 0.00 | 4.76 | 5.58 | 3.80 | 0.87 | 0.00 | 0.00 | 0.00 | 0.00 | 100.00 |
| Ex. 15 | 11.44 | 2.95 | 0.00 | 4.78 | 5.40 | 3.31 | 1.38 | 0.00 | 0.00 | 0.00 | 0.00 | 100.00 |
| Ex. 16 | 11.44 | 3.20 | 0.00 | 4.78 | 5.40 | 3.61 | 1.18 | 0.00 | 0.00 | 0.00 | 0.00 | 100.00 |
| Ex. 17 | 11.44 | 3.45 | 0.00 | 5.08 | 5.40 | 3.51 | 0.88 | 0.00 | 0.00 | 0.00 | 0.00 | 100.00 |
| Ex. 18 | 11.44 | 2.95 | 0.00 | 4.78 | 5.40 | 3.31 | 1.38 | 0.00 | 0.00 | 0.00 | 0.00 | 100.00 |
| Ex. 19 | 11.44 | 2.95 | 0.00 | 4.78 | 5.40 | 3.31 | 1.38 | 0.00 | 0.00 | 0.00 | 0.00 | 100.00 |
| Ex. 20 | 11.44 | 2.95 | 0.00 | 4.78 | 5.40 | 3.31 | 1.38 | 0.00 | 0.00 | 0.00 | 0.00 | 100.00 |
| Ex. 21 | 11.33 | 2.92 | 0.00 | 4.73 | 5.35 | 3.28 | 1.37 | 0.00 | 0.00 | 0.00 | 0.99 | 100.00 |
| Ex. 22 | 11.44 | 2.95 | 0.00 | 4.78 | 6.26 | 3.84 | 0.00 | 0.00 | 0.00 | 0.00 | 0.00 | 100.00 |
| Ex. 23 | 11.44 | 2.95 | 0.00 | 3.78 | 5.90 | 3.81 | 1.38 | 0.00 | 0.00 | 0.00 | 0.00 | 100.00 |
| Ex. 24 | 11.44 | 2.95 | 0.00 | 4.78 | 4.40 | 3.31 | 1.38 | 0.00 | 0.00 | 0.00 | 0.00 | 100.00 |
| Ex. 25 | 11.73 | 3.03 | 0.00 | 4.90 | 5.54 | 3.40 | 1.42 | 0.00 | 0.00 | 0.00 | 0.00 | 100.00 |
| Ex. 26 | 11.22 | 2.90 | 0.00 | 4.69 | 5.30 | 3.25 | 1.35 | 0.00 | 0.00 | 0.00 | 0.00 | 100.00 |
| Ex. 27 | 11.79 | 0.00 | 0.00 | 4.93 | 5.57 | 3.41 | 1.42 | 0.00 | 0.00 | 0.00 | 0.00 | 100.00 |
| Ex. 28 | 11.22 | 4.86 | 0.00 | 4.69 | 5.30 | 3.25 | 1.35 | 0.00 | 0.00 | 0.00 | 0.00 | 100.00 |
| Ex. 29 | 11.44 | 2.95 | 0.00 | 4.78 | 6.40 | 3.31 | 1.38 | 0.00 | 0.00 | 0.00 | 0.00 | 100.00 |
| Ex. 30 | 11.44 | 2.95 | 0.00 | 4.78 | 7.40 | 3.31 | 1.38 | 0.00 | 0.00 | 0.00 | 0.00 | 100.00 |

| | | $Si^{4+} + B^{3+}$ | $Li^+ + Na^+ + K^+$ | $Mg^{2+} + Ca^{2+} + Sr^{2+} + Ba^{2+}$ | $La^{3+} + Gd^{3+} + Y^{3+}$ | $Ti^{4+} + Nb^{5+} + Ta^{5+} + W^{6+}$ |
|---|---|---|---|---|---|---|
| Ex. 1 | cation % | 44 | 0 | 0 | 37 | 11 |
| Ex. 2 | cation % | 45 | 0 | 0 | 37 | 10 |
| Ex. 3 | cation % | 45 | 0 | 0 | 37 | 11 |
| Ex. 4 | cation % | 45 | 0 | 0 | 37 | 11 |
| Ex. 5 | cation % | 45 | 0 | 0 | 37 | 10 |
| Ex. 6 | cation % | 46 | 0 | 0 | 37 | 10 |
| Ex. 7 | cation % | 46 | 0 | 0 | 37 | 10 |
| Ex. 8 | cation % | 46 | 0 | 0 | 37 | 10 |
| Ex. 9 | cation % | 47 | 0 | 0 | 37 | 10 |
| Ex. 10 | cation % | 47 | 0 | 0 | 37 | 10 |
| Ex. 11 | cation % | 47 | 0 | 0 | 37 | 10 |
| Ex. 12 | cation % | 46 | 0 | 1 | 37 | 10 |
| Ex. 13 | cation % | 46 | 0 | 1 | 37 | 10 |
| Ex. 14 | cation % | 46 | 0 | 1 | 37 | 10 |
| Ex. 15 | cation % | 45 | 0 | 0 | 37 | 10 |
| Ex. 16 | cation % | 46 | 0 | 0 | 38 | 10 |
| Ex. 17 | cation % | 45 | 0 | 0 | 38 | 10 |
| Ex. 18 | cation % | 45 | 1 | 0 | 37 | 10 |
| Ex. 19 | cation % | 45 | 1 | 0 | 37 | 10 |
| Ex. 20 | cation % | 45 | 1 | 0 | 37 | 10 |
| Ex. 21 | cation % | 45 | 0 | 0 | 37 | 10 |
| Ex. 22 | cation % | 45 | 0 | 0 | 37 | 10 |
| Ex. 23 | cation % | 45 | 0 | 0 | 37 | 11 |
| Ex. 24 | cation % | 46 | 0 | 0 | 37 | 9 |
| Ex. 25 | cation % | 46 | 0 | 0 | 38 | 10 |
| Ex. 26 | cation % | 44 | 0 | 0 | 37 | 10 |
| Ex. 27 | cation % | 47 | 0 | 0 | 36 | 10 |
| Ex. 28 | cation % | 44 | 0 | 0 | 39 | 10 |
| Ex. 29 | cation % | 44 | 0 | 0 | 37 | 11 |
| Ex. 30 | cation % | 43 | 0 | 0 | 37 | 12 |

| | | $B^{3+}/(Si^{4+} + B^{3+})$ | $Zn^{2+}/Gd^{3+}$ | $Gd^{3+}/(Ti^{4+} + Nb^{5+} + Ta^{5+} + W^{6+})$ | $Ta^{5+}/(Ti^{4+} + Nb^{5+} + Ta^{5+} + W^{6+})$ | $Ti^{4+}/(Ti^{4+} + Nb^{5+} + Ta^{6+} + W^{6+})$ |
|---|---|---|---|---|---|---|
| Ex. 1 | cation ratio | 0.77 | 0.32 | 0.81 | 0.21 | 0.48 |
| Ex. 2 | cation ratio | 0.77 | 0.32 | 0.89 | 0.23 | 0.53 |
| Ex. 3 | cation ratio | 0.77 | 0.32 | 0.87 | 0.22 | 0.57 |
| Ex. 4 | cation ratio | 0.77 | 0.32 | 0.87 | 0.22 | 0.38 |
| Ex. 5 | cation ratio | 0.77 | 0.22 | 1.31 | 0.18 | 0.54 |
| Ex. 6 | cation ratio | 0.77 | 0.22 | 1.11 | 0.13 | 0.59 |
| Ex. 7 | cation ratio | 0.77 | 0.22 | 1.11 | 0.13 | 0.54 |
| Ex. 8 | cation ratio | 0.78 | 0.17 | 1.11 | 0.08 | 0.54 |
| Ex. 9 | cation ratio | 0.78 | 0.12 | 1.14 | 0.04 | 0.59 |
| Ex. 10 | cation ratio | 0.78 | 0.12 | 1.14 | 0.04 | 0.54 |
| Ex. 11 | cation ratio | 0.78 | 0.12 | 1.17 | 0.04 | 0.54 |
| Ex. 12 | cation ratio | 0.76 | 0.12 | 1.16 | 0.04 | 0.54 |
| Ex. 13 | cation ratio | 0.77 | 0.12 | 1.16 | 0.04 | 0.54 |
| Ex. 14 | cation ratio | 0.77 | 0.17 | 1.11 | 0.08 | 0.54 |
| Ex. 15 | cation ratio | 0.77 | 0.22 | 1.13 | 0.14 | 0.54 |
| Ex. 16 | cation ratio | 0.77 | 0.15 | 1.12 | 0.12 | 0.53 |
| Ex. 17 | cation ratio | 0.77 | 0.15 | 1.17 | 0.09 | 0.55 |
| Ex. 18 | cation ratio | 0.77 | 0.13 | 1.13 | 0.14 | 0.54 |
| Ex. 19 | cation ratio | 0.77 | 0.13 | 1.13 | 0.14 | 0.54 |
| Ex. 20 | cation ratio | 0.77 | 0.13 | 1.13 | 0.14 | 0.54 |
| Ex. 21 | cation ratio | 0.77 | 0.22 | 1.13 | 0.14 | 0.54 |
| Ex. 22 | cation ratio | 0.77 | 0.22 | 1.13 | 0.00 | 0.62 |
| Ex. 23 | cation ratio | 0.77 | 0.22 | 1.03 | 0.12 | 0.53 |
| Ex. 24 | cation ratio | 0.76 | 0.22 | 1.26 | 0.15 | 0.48 |

TABLE 1-continued

| | | | | | | |
|---|---|---|---|---|---|---|
| Ex. 25 | cation ratio | 0.77 | 0.00 | 1.13 | 0.14 | 0.53 |
| Ex. 26 | cation ratio | 0.77 | 0.39 | 1.13 | 0.14 | 0.54 |
| Ex. 27 | cation ratio | 0.77 | 0.22 | 1.13 | 0.14 | 0.54 |
| Ex. 28 | cation ratio | 0.77 | 0.22 | 1.13 | 0.14 | 0.54 |
| Ex. 29 | cation ratio | 0.76 | 0.22 | 1.03 | 0.12 | 0.58 |
| Ex. 30 | cation ratio | 0.76 | 0.22 | 0.95 | 0.11 | 0.61 |

| | nd | vd | $P_{g,F}$ | $\Delta P_{g,f}$ | Specific gravity | Tg (°C.) | Ts (°C.) | Liquidus temp. (°C.) | λ70 (nm) | λ5 (nm) |
|---|---|---|---|---|---|---|---|---|---|---|
| Ex. 1 | 1.909 | 36.6 | 0.580 | −0.003 | 5.26 | 704 | 753 | Less than 1210 | 401 | 351 |
| Ex. 2 | 1.901 | 37.3 | 0.581 | 0.000 | 5.25 | 703 | 751 | Less than 1210 | 404 | 351 |
| Ex. 3 | 1.903 | 37.1 | 0.577 | −0.004 | 5.22 | 705 | 753 | Less than 1210 | 412 | 350 |
| Ex. 4 | 1.903 | 37.4 | 0.580 | −0.001 | 5.24 | 704 | 752 | Less than 1270 | 404 | 346 |
| Ex. 5 | 1.900 | 37.4 | 0.580 | −0.001 | 5.27 | 708 | 755 | Less than 1230 | 407 | 351 |
| Ex. 6 | 1.900 | 37.3 | 0.582 | 0.001 | 5.20 | 706 | 754 | Less than 1210 | 411 | 352 |
| Ex. 7 | 1.900 | 37.4 | 0.583 | 0.002 | 5.20 | 706 | 754 | Less than 1210 | 409 | 351 |
| Ex. 8 | 1.900 | 37.1 | 0.576 | −0.006 | 5.17 | 707 | 754 | Less than 1210 | 412 | 350 |
| Ex. 9 | 1.900 | 37.0 | 0.577 | −0.005 | 5.15 | 708 | 753 | Less than 1220 | 414 | 351 |
| Ex. 10 | 1.900 | 37.1 | 0.579 | −0.002 | 5.15 | 707 | 753 | Less than 1210 | 412 | 350 |
| Ex. 11 | 1.900 | 37.1 | 0.579 | −0.002 | 5.17 | 706 | 751 | Less than 1230 | 412 | 350 |
| Ex. 12 | 1.900 | 37.1 | 0.578 | −0.003 | 5.16 | 709 | 756 | Less than 1230 | 411 | 350 |
| Ex. 13 | 1.898 | 37.2 | 0.580 | −0.001 | 5.16 | 708 | 753 | Less than 1230 | 411 | 350 |
| Ex. 14 | 1.900 | 37.1 | 0.577 | −0.005 | 5.17 | 708 | 756 | Less than 1220 | 406 | 351 |
| Ex. 15 | 1.901 | 37.4 | 0.580 | −0.001 | 5.22 | 709 | 756 | Less than 1220 | 401 | 348 |
| Ex. 16 | 1.901 | 36.4 | 0.580 | −0.003 | 5.19 | 709 | 757 | Less than 1230 | 410 | 349 |
| Ex. 17 | 1.901 | 37.5 | 0.579 | −0.002 | 5.20 | 713 | 760 | Less than 1230 | 409 | 349 |
| Ex. 18 | 1.900 | 37.5 | 0.580 | −0.001 | 5.20 | 699 | 751 | Less than 1230 | 408 | 349 |
| Ex. 19 | 1.898 | 37.4 | 0.580 | −0.001 | 5.19 | 706 | 756 | Less than 1230 | 409 | 348 |
| Ex. 20 | 1.900 | 37.4 | 0.580 | −0.001 | 5.20 | 711 | 759 | Less than 1230 | 410 | 349 |
| Ex. 21 | 1.899 | 37.6 | 0.582 | 0.001 | 5.20 | 708 | 756 | Less than 1230 | 406 | 348 |
| Ex. 22 | 1.903 | 36.8 | 0.579 | −0.003 | 5.14 | 707 | 753 | Less than 1230 | 412 | 352 |
| Ex. 23 | 1.903 | 36.8 | 0.580 | −0.002 | 5.20 | 705 | 752 | Less than 1230 | 411 | 352 |
| Ex. 24 | 1.892 | 38.3 | 0.576 | −0.003 | 5.20 | 710 | 754 | Less than 1230 | 402 | 348 |
| Ex. 25 | 1.901 | 37.4 | 0.581 | 0.000 | 5.20 | 721 | 766 | Less than 1230 | 410 | 350 |
| Ex. 26 | 1.901 | 37.4 | 0.580 | −0.001 | 5.22 | 698 | 748 | Less than 1230 | 411 | 348 |
| Ex. 27 | 1.899 | 37.3 | 0.580 | −0.001 | 5.20 | 700 | 746 | Less than 1230 | 407 | 350 |
| Ex. 28 | 1.903 | 37.6 | 0.578 | −0.003 | 5.22 | 714 | 762 | Less than 1250 | 406 | 348 |
| Ex. 29 | 1.910 | 36.6 | 0.583 | 0.001 | 5.21 | 710 | 758 | Less than 1230 | 415 | 351 |
| Ex. 30 | 1.917 | 35.8 | 0.585 | 0.001 | 5.23 | 711 | 762 | Less than 1230 | 419 | 353 |

The various characteristics of each optical glass were measured by the methods indicated below.

(1) Refractive Indexes nd, ng, nF, nc, and Abbé Number vd

The refractive indexes nd, ng, nF, nc, and Abbé number vd of an optical glass obtained at a temperature reduction rate of −30° C./hour were measured by the refractive index measurement methods of the Japan Optical Glass Industry Association Standards.

(2) Liquidus Temperature LT

The glass was charged to a furnace that had been heated to a prescribed temperature, maintained there for two hours, and cooled. The interior of the glass was then observed with an optical microscope at 100-fold magnification and the liquidus temperature was determined based on the presence or absence of crystals.

(3) Glass Transition Temperature Tg and Yield Point Ts

Using a thermomechanical analyzer made by Rigaku Corporation, the temperature was raised at a rate of 4° C./minute and measurement was conducted.

(4) Partial Dispersion Ratio Pg, F

This was calculated from the refractive indexes ng, nF, and nc.

(5) Difference ΔPg, F of the Partial Dispersion Ratio from the Normal Line

This was calculated from the partial dispersion ratio Pg, F(0) on the normal line calculated from the partial dispersion ratio Pg, F and the Abbé number vd.

(6) Specific Gravity

This was calculated by Archimedes' method.

(7) λ70, λ5

These were obtained by measuring the spectral transmittance with a spectrophotometer.

(8) Evaluation of Glass Stability

In each Example, no crystal precipitation was observed when the glass block (about 150 g) of the optical glass obtained by the method set forth above was visually inspected.

Although the quantity of $Ta_2O_5$ was kept low in each of the optical glasses of the Examples, they were determined to be high-refractive-index, low-dispersion glasses affording good stability and suitability to manufacturing based on the above evaluation results.

2. Fabrication of Press-Molding Glass Materials (1)

Molded glass articles comprised of the various optical glasses fabricated in 1. above were each cut into multiple pieces of glass. Each piece of glass was ground and polished to fabricate a press-molding glass material.

Each optical glass exhibited good machining properties, making it possible to fabricate press-molding glass materials from the molded glass articles without breakage of glass.

3. Fabrication of Press-Molding Glass Materials (2)

In the same manner as in 1. above, a glass melt was prepared and caused to flow out of a pipe. The front tip of the glass melt flow that flowed out was separated to obtain a glass melt gob. The glass melt gob was subjected to wind pressure on a forming mold and molded while being floated to fabricate a press-molding glass material. Press-molding glass materials comprised of the various optical glasses shown in Table 1 were thus fabricated.

It was also possible to press mold the glass melt gob on the forming mold and then cool it while it was being floated to prepare the glass material.

4. Fabrication of an Optical Element

The press-molding glass materials fabricated in 2. and 3. above were each heated, softened, introduced into a pressing mold, and press molded to fabricate a lens blank having a shape approximating the shape of a lens.

The lens blank thus fabricated was annealed to reduce distortion. Subsequently, the lens blank was ground and polished by the known methods to fabricate a spherical lens. It was also possible to fabricate an aspherical lens by aspherically processing the lens blank.

The lens blank was made of glass affording good machining properties. Thus, it was possible to fabricate lenses of desired performance by grinding and polishing without breakage of glass.

Antireflective films were formed on the surfaces of the lenses comprised of the various optical glasses thus fabricated.

5. Fabrication of an Image Pickup Device and an Optical System

Various replacement lenses for single-lens reflex cameras with built-in lenses were fabricated from the various lenses fabricated in 4. above.

The various lenses fabricated in 4. above were used to fabricate the various optical systems of compact digital cameras and modularized. These optical systems were then further modularized by mounting CCDs or CMOS image sensors.

Thus, using the various lenses fabricated in 4. above, it was possible to obtain highly functional, compact optical systems, replacement lenses, lens modules, and image pickup devices. By combining the lenses fabricated in 4. above with lenses made of high-refractive-index, high-dispersion optical glasses, it was possible to obtain various optical systems conducting high-order chromatic aberration correction and image pickup devices equipped with these optical systems.

Using the various lenses fabricated in 4. above, projectors with various built-in lenses were fabricated.

In the same manner as for the image pickup devices, it was possible to obtain projectors that performed high-order chromatic aberration correction through combination with lenses made of high-refractive-index, high-dispersion optical glasses.

Comparative Examples 1 to 4

Starting materials in the form of various corresponding oxides, carbonates, sulfates, nitrates, hydroxides, and the like were suitably weighed out to incorporate the various components and achieve the glass compositions indicated in Table 2. In each case, these components were then thoroughly mixed to obtain a blended starting material, which was then charged to a platinum crucible, heated to 1,200 to 1,450° C. for 1 to 3 hours, melted, clarified, and homogenized. The glass melt thus obtained was caused to flow into a mold made of carbon, cooled to the glass transition temperature, and then immediately charged to an annealing furnace. There, it was annealed for about one hour at the glass transition temperature range and then cooled to room temperature within the furnace. In Comparative Examples 1 and 2, in which the cation ratio $(Gd^{3+}/(Ti^{4+}+Nb^{5+}+Ta^{5+}+W^{6+}))$ was outside the above-described range, and in Comparative Example 4, in which the cation ratio $Zn^{2+}/Gd^{3+}$ was outside the above-described range, crystallization ended up occurring without vitrification as shown in the digital camera photograph of FIG. 1, and optical glass could not be obtained.

Although vitrification occurred in the optical glass obtained in Comparative Example 3, in which the cation ratio $(Gd^{3+}/(Ti^{4+}+Nb^{5+}+Ta^{5+}+W^{6+}))$ was outside the above-described range, when the various characteristics of the optical glass obtained were measured by the methods set forth above, a refractive index of equal to or higher than 1.890 had not been achieved.

| No. | | $Si^{4+}$ | $B^{3+}$ | $Li^+$ | $Na^+$ | $K^+$ | $Mg^{2+}$ | $Ca^{2+}$ | $Sr^{2+}$ | $Ba^{2+}$ | $Zn^{2+}$ | $La^{3+}$ |
|---|---|---|---|---|---|---|---|---|---|---|---|---|
| Comp. Ex. 1 | cation % | 10.41 | 34.78 | 0.00 | 0.00 | 0.00 | 0.00 | 0.00 | 0.00 | 0.00 | 2.49 | 28.56 |
| Comp. Ex. 2 | cation % | 9.91 | 33.13 | 0.00 | 0.00 | 0.00 | 0.00 | 0.00 | 0.00 | 0.00 | 2.36 | 21.96 |
| Comp. Ex. 3 | cation % | 10.41 | 40.30 | 0.00 | 0.00 | 0.00 | 0.00 | 0.00 | 0.00 | 0.00 | 2.47 | 23.06 |
| Comp. Ex. 4 | cation % | 10.41 | 30.80 | 0.00 | 0.00 | 0.00 | 0.00 | 0.00 | 0.00 | 0.00 | 9.47 | 23.06 |

| No. | $Gd^{3+}$ | $Y^{3+}$ | $Yb^{3+}$ | $Zr^{4+}$ | $Ti^{4+}$ | $Nb^{5+}$ | $Ta^{5+}$ | $W^{8+}$ | $Te^{4+}$ | $Ge^{4+}$ | $Bi^{3+}$ | $Al^{3+}$ | Total |
|---|---|---|---|---|---|---|---|---|---|---|---|---|---|
| Comp. Ex. 1 | 5.94 | 2.95 | 0.00 | 4.78 | 5.40 | 3.31 | 1.38 | 0.00 | 0.00 | 0.00 | 0.00 | 0.00 | 100.00 |
| Comp. Ex. 2 | 17.56 | 2.81 | 0.00 | 4.55 | 3.24 | 3.16 | 1.32 | 0.00 | 0.00 | 0.00 | 0.00 | 0.00 | 100.00 |
| Comp. Ex. 3 | 5.94 | 2.95 | 0.00 | 4.78 | 5.40 | 3.31 | 1.38 | 0.00 | 0.00 | 0.00 | 0.00 | 0.00 | 100.00 |
| Comp. Ex. 4 | 11.44 | 2.95 | 0.00 | 4.78 | 2.40 | 3.31 | 1.38 | 0.00 | 0.00 | 0.00 | 0.00 | 0.00 | 100.00 |

| No. | | $Si^{4+} + B^{3+}$ | $Li^+ + Na^+ + K^+$ | $Mg^{2+} + Ca^{2+} + Sr^{2+} + Ba^{2+}$ | $La^{3+} + Gd^{3+} + Y^{3+}$ | $Ti^{4+} + Nb^{5+} + Ta^{5+} + W^{6+}$ |
|---|---|---|---|---|---|---|
| Comp. Ex. 1 | cation % | 45 | 0 | 0 | 37 | 10 |
| Comp. Ex. 2 | cation % | 43 | 0 | 0 | 42 | 8 |
| Comp. Ex. 3 | cation % | 51 | 0 | 0 | 32 | 10 |
| Comp. Ex. 4 | cation % | 41 | 0 | 0 | 37 | 7 |

-continued

| No. | | $B^{3+}/(Si^{4+}+B^{3+})$ | $Zn^{2+}/Gd^{3+}$ | $Gd^{3+}/(Ti^{4+}+Nb^{6+}+Ta^{5+}+W^{6+})$ | $Ta^{5+}/(Ti^{4+}+Nb^{5+}+Ta^{5+}+W^{6+})$ | $Ti^{4+}/(Ti^{4+}+Nb^{5+}+Ta^{5+}+W^{6+})$ |
|---|---|---|---|---|---|---|
| Comp. Ex. 1 | cation ratio | 0.77 | 0.42 | 0.59 | 0.14 | 0.54 |
| Comp. Ex. 2 | cation ratio | 0.77 | 0.13 | 2.27 | 0.17 | 0.42 |
| Comp. Ex. 3 | cation ratio | 0.79 | 0.42 | 0.59 | 0.14 | 0.54 |
| Comp. Ex. 4 | cation ratio | 0.75 | 0.83 | 1.61 | 0.19 | 0.34 |

| No. | nd | vd | $P_{g,F}$ | $\Delta P_{g,f}$ | Specific gravity | Tg (°C.) | Ts (°C.) | Liquidus temp (°C.) | λ 70 (nm) | λ 5 (nm) |
|---|---|---|---|---|---|---|---|---|---|---|
| Comp. Ex. 1 | Not vitrification | — | — | — | — | — | — | — | — | — |
| Comp. Ex. 2 | Not vitrification | — | — | — | — | — | — | — | — | — |
| Comp. Ex. 3 | 1.877 | 37.5 | 0.578 | −0.002 | 4.87 | 688 | 730 | Less than 1140° C. | 403 | 350 |
| Comp. Ex. 4 | Not vitrification | — | — | — | — | — | — | — | — | — |

The present invention is useful in the field of manufacturing image pickup optical systems and projection optical systems.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention

What is claimed is:

1. An optical glass, which is an oxide glass comprising, denoted as cation percentages:
    a combined content of $Si^{4+}$ and $B^{3+}$ of 35 to 55 percent;
    a combined content of $La^{3+}$, $Gd^{3+}$, and $Y^{3+}$ of 30 to 55, wherein a content of $Gd^{3+}$ ranging from 5 to 20 percent;
    a combined content of $Ti^{4+}$, $Nb^{5+}$, $Ta^{5+}$ and $W^{6+}$ of 7 to 20 percent;
    2 to 8 percent of $Zr^{4+}$; and
    0 to 10 percent of $Zn^{2+}$;
    wherein a cation ratio of a content of $Zn^{2+}$ to a content of $Gd^{3+}$ ($Zn^{2+}/Gd^{3+}$) ranges from 0 to 0.80;
    a cation ratio of the content of $Gd^{3+}$ to the combined content of $Ti^{4+}$, $Nb^{5+}$, $Ta^{5+}$, and $W^{6+}$ ($Gd^{3+}/(Ti^{4+}+Nb^{5+}+Ta^{5+}+W^{6+})$) ranges from 0.65 to 2.00;
    a cation ratio of a content of $Ta^{5+}$ to the combined content of $Ti^{4+}$, $Nb^{5+}$, $Ta^{5+}$, and $W^{6+}$ ($Ta^{5+}/(Ti^{4+}+Nb^{5+}+Ta^{5+}+W^{6+})$) ranges from 0 to 0.30;
    a cation ratio of a content of $Ti^{4+}$ to the combined content of $Ti^{4+}$, $Nb^{5+}$, $Ta^{5+}$, and $W^{6+}$ ($Ti^{4+}/(Ti^{4+}+Nb^{5+}+Ta^{5+}+W^{6+})$) ranges from 0.30 to 0.90; and
    which has a refractive index ranging from 1.890 to 1.950, and an Abbé number vd of equal to or lower than 39.0, the Abbé number vd satisfying a relation of vd≥(2.334−nd)/0.012 relative to the refractive index nd.

2. The optical glass according to claim 1, wherein a content of $Ta^{5+}$ ranges from 0 to 4 cation percent.

3. The optical glass according to claim 1, wherein a content of $Si^{4+}$ ranges from 6 to 15 cation percent, and a content of $B^{3+}$ ranges from 25 to 45 cation percent.

4. The optical glass according to claim 1, wherein a content of $La^{3+}$ ranges from 15 to 30 cation percent.

5. The optical glass according to claim 1, wherein a content of $Ti^{4+}$ ranges from 1 to 10 cation percent.

6. The optical glass according to claim 1, which has a liquidus temperature of equal to or lower than 1,300° C.

7. The optical glass according to claim 1, which has a glass transition temperature of equal to or greater than 650° C.

8. The optical glass according to claim 1, which has a specific gravity ranging from 4.50 to 5.50.

9. A press-molding glass material, which is comprised of the optical glass according to claim 1.

10. An optical element, which is comprised of the optical glass according to claim 1.

11. A method of manufacturing an optical element, which comprises steps of:
    preparing a molded glass article by heating and press molding with a pressing mold the press-molding glass material according to claim 9; and
    processing the molded glass article that has been prepared to provide an optical element.

* * * * *